(No Model.)
F. CHALLONER.
SHINGLE SAWING MACHINE.
No. 430,564. Patented June 17, 1890.
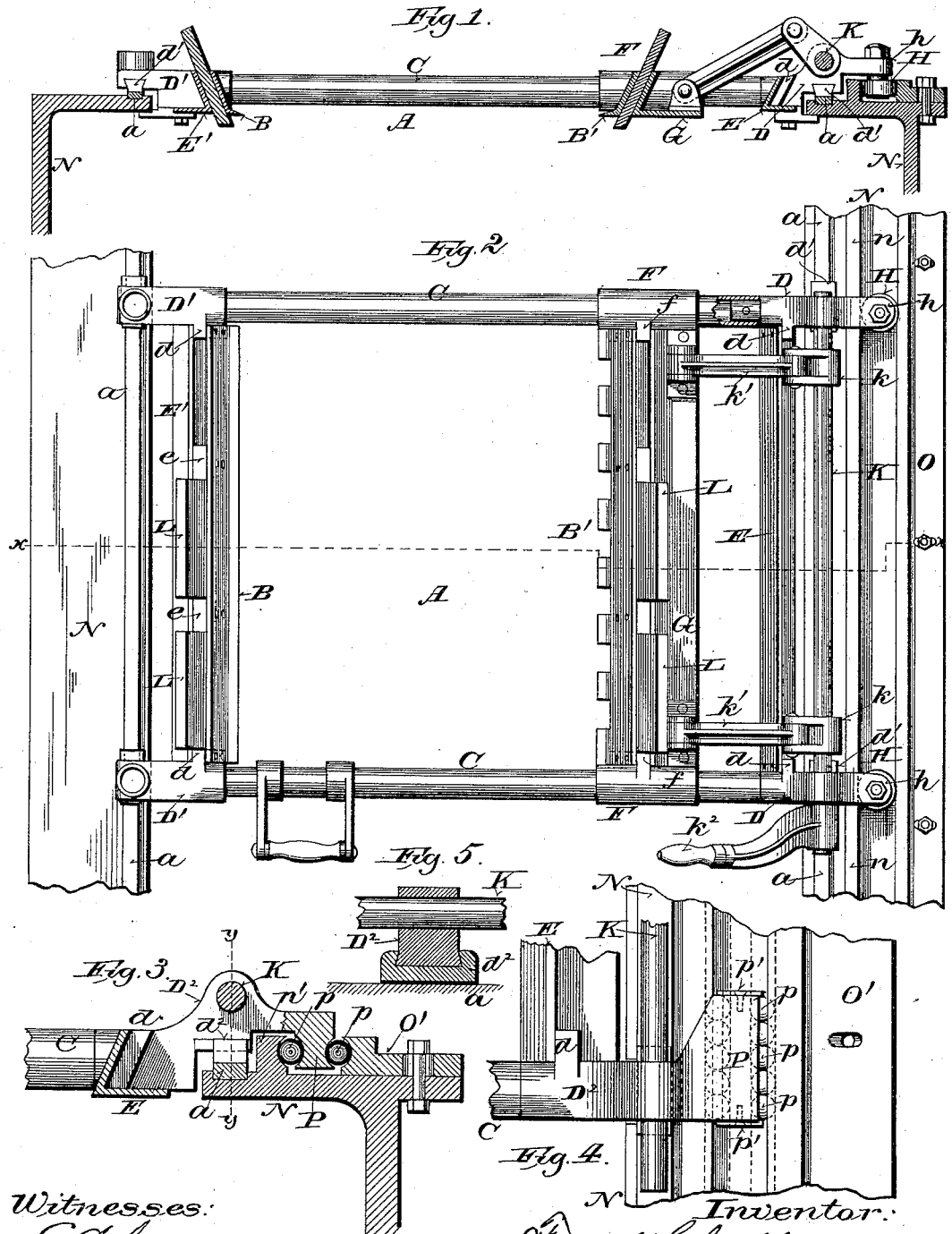

UNITED STATES PATENT OFFICE.

FRANK CHALLONER, OF OSHKOSH, WISCONSIN.

SHINGLE-SAWING MACHINE.

SPECIFICATION forming part of Letters Patent No. 430,564, dated June 17, 1890.

Application filed August 20, 1889. Serial No. 321,402. (No model.)

*To all whom it may concern:*

Be it known that I, FRANK CHALLONER, of Oshkosh, in the county of Winnebago and State of Wisconsin, have invented certain new and useful Improvements in Shingle-Sawing Machines; and I do hereby declare that the following is a full, clear, and exact description of the invention, which will enable others skilled in the art to which it pertains to make and use the same, reference being had to the accompanyng drawings, and to the letters of reference marked thereon, which form a part of this specification.

The main objects of my invention are to secure the maximum of strength together with the minimum of weight in the construction of the carriage, to avoid the friction due to the end-thrust of the carriage, and to prevent end-play of the carriage.

It consists of certain peculiarities of construction and arrangement hereinafter particularly described, and pointed out in the claims.

In the accompanying drawings like letters designate the same parts in the several figures.

Figure 1 is a vertical section of a carriage for shingle-sawing machines embodying my improvements, taken on the line $xx$, Fig. 2. Fig. 2 is a plan view. Fig. 3 is a vertical section of a modified form of one of the anti-friction bearings. Fig. 4 is a plan view of the corresponding bearing on the opposite side of the carriage. Fig. 5 is a vertical section on the line $y\,y$, Fig. 3.

A represents the carriage, composed of tubular side sections C C, to the ends of which are secured the corner-pieces D D', formed on their inner faces with inclined flanges $d\,d$ and provided with suitable bearing faces or blocks $d'\,d'$, which are adapted to slide on suitable ways $a\,a$ on the frame N of the machine.

E E' are the end sections, bent to an angle in cross-section and riveted or otherwise rigidly attached at the ends to the inclined flanges $d\,d$ of the corner-pieces. To the inner and upper faces of the flanges $d\,d$ on the corner-pieces D' D' are rigidly attached the ends of the fixed dog B.

F F are sleeves mounted and adapted to slide endwise upon the tubular side sections C C. They are formed on their inner faces with inclined flanges $f\,f$, to the inner upper faces of which are rigidly attached the ends of the movable dog B', and to the outer and under faces of said flanges are attached the ends of a cross-piece G, of plate or wrought metal, bent to an angle in cross-section, as shown in Fig. 1. Between the end section E' and the fixed dog B and between the movable dog B' and the cross-piece G are interposed blocks $e\,e$, to which they are riveted or otherwise suitably secured. In the spaces thus left between said blocks $e\,e$ and between the dog B and adjacent end section E' and the dog B' and adjacent cross-piece G are inserted the ordinary wooden dogs or guards L L.

For the operation of the movable dog B', I employ the ordinary rock-shaft K, journaled in the corner-pieces D D, and provided with crank-arms $k\,k$, which are connected by links $k'\,k'$ with the cross-piece G. The rock-shaft K is turned by a hand-lever $k^2$, mounted on its front end.

By the construction of the carriage hereinbefore described it is rendered very stiff and strong with a minimum amount of metal, thereby securing lightness, which is particularly desirable in hand-actuated carriages.

To avoid the friction which would otherwise occur between the bearings of the carriage and the ways on which it travels by the end-thrust of the carriage produced by the action of the saw, I provide a way $n$ on the frame of the machine parallel with the main carriage-ways, and friction-rollers H H, which are carried in a horizontal position by projections $h\,h$ on the corner-pieces D D and bear against the outer vertical face of said way $n$, and to prevent end-play of the carriage I provide a bearing-strip O, which is adjustably attached to the frame N, parallel with the way $n$, and on the opposite side of the friction-rollers H.

Referring to Figs. 3 and 4, illustrating a modification of the anti-friction bearing and device to prevent end-play of the carriage, P P are overhanging and depending projections on the corner-pieces $D^2\,D^2$ of the carriage, having longitudinal concaved depressions in its opposite vertical sides parallel with the carriage-ways. $n'$ is a fixed way or rib on the frame of the machine parallel with the carriage-ways and having a longitudinal concave depression on its outer vertical face, and O' is a laterally-adjustable bearing-strip attached to the frame N of the machine parallel with the way or rib n' and having on its inner vertical face a similar longitudinal concaved depression. Between the concave faces of the projections P and the way or rib n' on the one side and the bearing-strip O' on the other side are loosely interposed a number of balls p p, held in place so as to be moved with the carriage by plates p' p', attached to the sides of the projections P P and extending over the ends of the concave depressions therein, as shown in Fig. 4.

Instead of the bearing-blocks d' d', which are inserted lengthwise in dovetailed grooves in the under sides of the corner-pieces D' D', I may employ bearing-blocks $d^2$, (shown in Figs. 3 and 5,) having dovetailed recesses, so as to be placed sidewise over the dovetailed edges of the corner-pieces $D^2 D^2$, as shown in Fig. 5.

Various changes in the details of construction of my improved carriage and bearings may be made without departing from the spirit of my invention.

I claim—

1. A carriage for shingle-sawing machines comprising tubular side sections, corner-pieces secured to the ends of said tubular side sections and formed on the inner sides with inclined flanges, and angle metal end sections rigidly attached at the ends to said inclined flanges, substantially as and for the purposes set forth.

2. A carriage for shingle-sawing machines, comprising tubular side sections, metallic corner blocks provided on their inner sides with inclined flanges, to which are rigidly attached at the ends metallic end sections which are angular in cross-section, a fixed dog attached at its ends to the inclined flanges at one end of the carriage, sleeves loosely mounted on the tubular sections at the opposite end of the carriage and provided with inclined flanges, an angular metallic crosspiece rigidly attached at its ends to the under faces of said flanges, and a dog attached at its ends to the upper faces of said flanges, substantially as and for the purposes set forth.

3. A carriage for shingle-sawing machines, comprising tubular side sections, corner-pieces secured thereto and provided with inclined flanges, metallic angular end sections rigidly attached at the ends to the under faces of said flanges, sleeves loosely mounted on said tubular sections near one end of the carriage and provided with inclined flanges, to the under faces of which are rigidly attached the ends of an angular metallic cross-girt, and dogs attached at the ends, one to the upper faces of the inclined flanges on said sleeves, the other to the upper faces of the flanges at the opposite end of the carriage, said dogs and the adjacent end section and cross-girt arranged to hold between them the wooden guards or dogs, substantially as and for the purposes set forth.

4. A carriage for shingle-sawing machines, comprising tubular side sections, corner-pieces secured thereto and provided with inclined flanges, angular end sections rigidly attached at the ends to said flanges, sleeves loosely mounted on said tubular sections and provided with like flanges, an angular cross-girt attached at its ends to the lower faces of said flanges, dogs attached one to the upper faces of the flanges on said sleeves and the other to the corresponding faces of the flanges at the opposite end of the carriage, and a rockshaft journaled in the end pieces adjacent to the movable dog, provided with an operating-lever and with cranks which are connected by links with the movable dog, substantially as and for the purposes set forth.

5. The combination, with the carriage and carriage-ways of a shingle-sawing machine, of friction-rollers carried by the carriage, a way against which said rollers bear laterally, and a laterally-adjustable bearing-strip parallel with said way, substantially as and for the purposes set forth.

6. The combination, with the carriage and carriage-ways of a shingle-sawing machine, of friction-rollers journaled on said carriage, a way against which said friction-rollers bear laterally to receive the end-thrust of the carriage, and a laterally-adjustable bearing-strip on the opposite side of said friction-rollers to take up end-play of the carriage, substantially as and for the purposes set forth.

In testimony that I claim the foregoing as my own I affix my signature in presence of two witnesses.

FRANK CHALLONER.

Witnesses:
W. C. RUCKMAN,
CHAS. L. GOSS.